United States Patent
Muldoon et al.

(10) Patent No.: US 7,943,675 B2
(45) Date of Patent: *May 17, 2011

(54) ELECTROLYTES FOR FUEL CELL ELECTRODES

(75) Inventors: John Muldoon, Saline, MI (US); Ryszard J. Wycisk, Beachwood, OH (US); Jun Lin, Cleveland, OH (US); Peter N. Pintauro, Beachwood, OH (US); Kohai Hase, Nagoya (JP)

(73) Assignees: Toyota Motor Engineering & Manufacturing North America, Inc., Erlanger, KY (US); Case Western Reserve University, Cleveland, OH (US); Toyota Motor Corporation, Aichi (JP)

( * ) Notice: Subject to any disclaimer, the term of this patent is extended or adjusted under 35 U.S.C. 154(b) by 476 days.

This patent is subject to a terminal disclaimer.

(21) Appl. No.: 12/049,542

(22) Filed: Mar. 17, 2008

(65) Prior Publication Data

US 2008/0167392 A1 Jul. 10, 2008

Related U.S. Application Data

(63) Continuation-in-part of application No. 11/391,592, filed on Mar. 28, 2006.

(60) Provisional application No. 60/666,276, filed on Mar. 29, 2005.

(51) Int. Cl.
*B01J 49/00* (2006.01)
*B01J 39/18* (2006.01)
*H01M 4/60* (2006.01)
*H01M 4/02* (2006.01)

(52) U.S. Cl. .......... 521/25; 429/213; 429/523; 429/530; 521/37

(58) Field of Classification Search .................. 521/25, 521/37; 429/213, 523, 530
See application file for complete search history.

(56) References Cited

U.S. PATENT DOCUMENTS

| | | | |
|---|---|---|---|
| 4,211,677 A | 7/1980 | Rose et al. | |
| 5,176,969 A | 1/1993 | Miyabayashi et al. | |
| 5,548,060 A | 8/1996 | Allcock et al. | |
| 6,110,236 A | 8/2000 | Tsang et al. | |
| 6,214,251 B1 | 4/2001 | Wu et al. | |
| 6,312,853 B1 * | 11/2001 | Zhang et al. | 429/213 |
| 6,365,294 B1 * | 4/2002 | Pintauro et al. | 429/493 |
| 6,605,237 B2 | 8/2003 | Allcock et al. | |
| 6,759,157 B1 | 7/2004 | Allcock et al. | |
| 6,946,211 B1 | 9/2005 | Bjerrum et al. | |
| 2004/0014936 A1 | 1/2004 | Grunze et al. | |
| 2004/0033406 A1 | 2/2004 | Andrianov et al. | |
| 2004/0039134 A1 | 2/2004 | Murakami et al. | |
| 2004/0225153 A1 | 11/2004 | Allcock et al. | |
| 2005/0014927 A1 | 1/2005 | Akita | |
| 2007/0015040 A1 | 1/2007 | Li et al. | |

FOREIGN PATENT DOCUMENTS

| | | |
|---|---|---|
| WO | 0072395 | 11/2000 |
| WO | 2006/076465 | 7/2006 |

OTHER PUBLICATIONS

R. Wycisk, J.K. Lee, and P.N. Pintauro. "Sulfonated Polyphosphazene-Polybenzimidazole Membranes for Direct Methanol Fuel Cells." Journal of Electrochemical Society, vol. 152, A892-A898 (2005).

C.J. Orne, J.R. Klaehn, F.R. Stewart. "Gas permeability and ideal selectivity of poly[bid-(phenoxy)-phosphzene], poly [bis-(4-tert-butylphenoxy)phosphazene], and poly[bis-(3,5-di-tert-butylphenoxy)1.2(chloro)0.8phosphazene]" Journal of Membrane Science, vol. 238, 47-55 (2004).

M.A. Hickner, H. Ghassemi, Y.S. Kim, B.R. Einsla, and J.E. McGrath. "Alternative Polymer Systems for Proton Exchange Membranes (PEMs)" Chemical Review 2004, vol. 104, p. 4587-4612.

J. Roziere and D.J. Jones. "Non-fluorinated polymer materials for proton exchange membrane fuel cells." Annual Review of Materials Research, Aug. 2003, vol. 33, p. 503-555.

Pintauro, Peter N. et al; "Sulfonated polyphosphazene membranes for direct methanol fuel cells"; Applicative Aspects of poly(organophosphazenes); 2004; pp. 225-254.

Allcock, H.R. et al.; "Phenyl Phosphonic Acid Functionalized Poly[Aryloxyphosphazenes] as Proton-Conducting Membranes for Direct Methanol Fuel Cells"; Journal of Membrane Science; (2002) pp. 47-54.

Fedkin, Mark V; "Evaluation of Methanol Crossover in Proton-Conducting Polyphosphazene Membranes"; Materials Letters; (2002) pp. 192-196.

Xiangyang Zhou et al.; "High Temperature Transport Properties of Polyphosphazene Membranes for Direct Methanol Fuel Cells"; Electrochimica Acta; (2003); pp. 2173-2180.

Allcock, Harry R. et al.; "Design and Synthesis of Ion-Conductive Polyphosphazenes for Fuel Cell Applications: Review"; Journal of Polymer Science; Part B: Polymer Physics, vol. 44; (2006) pp. 2358-2368.

Allcock, H.R. et al.; "Phosphonation of Aryloxyphosphazenes"; Macromolecules; (2001). Hoffman, M.A. et al.; "Synthesis of Polyphosphazenes with Sulfonimide Side Groups"; Macromolecules (2002).

Allcock, H.R. et al.; "Phenylphosphonic Acid Functionalized Poly[aryloxyphosphazenes]"; Macromolecules; (2002).

Fei, S.T. et al.; "Inorganic-organic Hybrid Polymers with Pendent Sulfonated Cyclic Phosphazene Side Groups as Potential Proton Conductive"; Journal of Membrane Science; (2008).

* cited by examiner

*Primary Examiner* — Michael M Bernshteyn
(74) *Attorney, Agent, or Firm* — Gifford, Krass, Sprinkle, Anderson & Citkowski, P.C.

(57) ABSTRACT

Improved polymer-based materials are described, for example for use as an electrode binder in a fuel cell. A fuel cell according to an example of the present invention comprises a first electrode including a catalyst and an electrode binder, a second electrode, and an electrolyte located between the first electrode and the second electrode. The electrolyte may be a proton-exchange membrane (PEM). The electrode binder includes one or more polymers, such as a polyphosphazene.

18 Claims, 6 Drawing Sheets

US 7,943,675 B2

ELECTROLYTES FOR FUEL CELL ELECTRODES

CROSS-REFERENCE TO RELATED APPLICATIONS

The present application is a continuation-in-part of, and is entitled to the benefit of the earlier filing date and priority of, co-pending U.S. patent application Ser. No. 11/391,592, filed Mar. 28, 2006, which claims priority to U.S. provisional application No. 60/666,276 filed Mar. 29, 2005, which is assigned to the same assignee as the current application, entitled "NOVEL ELECTROLYTES TO ENHANCE OXYGEN REDUCTION REACTION (ORR) IN THE CATHODE LAYER OF PEM FUEL CELL," the disclosure of which is hereby incorporated by reference.

FIELD OF THE INVENTION

The invention relates to oxygen permeable materials, in particular to oxygen permeable polymers and fuel cells using such materials.

BACKGROUND OF THE INVENTION

Fuel cells are attracting great attention due to their high energy conversion efficiency and low pollution emission, relative to conventional combustion engines and other sources of power. Proton-exchange membrane fuel cells (PEM-FCs) are promising power generators for portable, stationary, and automotive applications. A PEM-FC includes a membrane electrode assembly, composed of a cation (proton) exchange membrane with catalyst powder electrodes attached to the opposing membranes surfaces. The electrodes include catalyst particles and an electrode binder. A proton exchange membrane is also sometimes referred to as a polymer electrolyte membrane.

Oxygen permeation through the cathode layer of the membrane electrode assembly is important for fuel cell operation. Oxygen molecules need to permeate through the electrolyte layer to the surface of the catalyst, where the oxygen molecules are activated by the cathode catalyst to react with protons and electrons to form water through the oxygen reduction reaction. The rate of oxygen permeation through the cathode is apparently the control step of the oxygen reduction reaction, so that increased oxygen permeation increases the activation rate of the oxygen reduction reaction, directly increasing fuel cell performance.

In a fuel cell, hydrogen is split into protons and electrons at the anode (negative electrode), and the protons are transported through the electrolyte (such as a proton-exchange membrane) to the cathode (positive electrode). An electrode binder that is a good proton conductor is useful for transporting protons through the electrode to the catalyst. Hence, an electrode binder that has one or more of good oxygen permeability, good dimensional stability, high proton conductivity, high electron conductivity, and oxygen activation is desirable.

For hydrogen/air and direct methanol fuel cells, a typical electrode binder is a perfluorosulfonic acid polymer such as Nafion® (DuPont). Nafion® is attractive as a binder because it possesses a number of desirable properties, including chemical stability, mechanical stability, high proton conductivity, and high gas permeability to oxygen (air) and hydrogen. Unfortunately, Nafion® is an expensive material due to its complicated manufacturing procedure. Also, there is a serious environmental issue of HF release upon its decomposition under fuel cell operating conditions, which would be avoided using a non-fluorinated polymer. These problems, and others, have impeded the commercialization of PEM fuel cells. Hence, much effort has been devoted to the development of a cheap non-fluorinated membrane for the application in PEM fuel cells. See J. Roziere and D. J. Jones, "Non-fluorinated Polymers Materials for Proton Exchange Membrane Fuel Cells", *Annu. Rev. Mater. Res.*, 33, 503-503 (2003); M. A. Hickner et al., "Alternative Polymer Systems for Proton Exchange Membranes", *Chem. Rev,* 104, 4587-4612 (2004). Although there has been significant research into new proton-exchange membrane materials for PEM fuel cells, there has been little research into finding alternatives to Nafion® for the electrode binder.

SUMMARY OF THE INVENTION

Disclosed herein, is a fuel cell electrode comprising a catalyst layer including a sulfonated polyaromatic polyphosphazene. The sulfonated polyaromatic polyphosphazene may comprise a polyphosphazene backbone and a polyaromatic functional group linked to the polyphosphazene backbone as a polyaromatic side chain. The sulfonated polyaromatic polyphosphazene may further comprise a non-polyaromatic functional group linked to the polyphosphazene as a non-polyaromatic side chain and an acidic functional group linked to the non-polyaromatic side chain. The fuel cell electrode further may further comprise an anode active material or a cathode active material.

The polyaromatic functional group may be selected from the group consisting of R and OR, wherein R comprises an extended pi conjugated system. Functional groups R and OR may be comprised of an extended pi conjugated system of an organic oligomer with at least two repeat units containing a six-membered aromatic sextet structure. Functional groups R and OR may also comprise a polycyclic aromatic group. Functional group R may be a fused six-membered aromatic sextet structure ring system having at least two rings. Functional group R may also be a six-membered aromatic sextet structure ring fused with a Five-membered ring structure. Functional group R may have at least two rings, a first ring being a six-membered aromatic sextet structure and a second ring containing a nonmetal selected from the group consisting of nitrogen and oxygen. The polyaromatic functional group may be an oligomer containing two or more phenyl groups. The mole fraction of the polyaromatic functional group linked to the polyphosphazene as a polyaromatic side chain may be between 0.05 and 0.60.

The non-polyaromatic functional group may be selected from the group consisting of OR, NRR', R and combinations thereof, wherein R and R' are selected from the group consisting of an alkyl, a fluoroalkyl, a phenyl, an oxyphenyl and an aromatic heterocycle. The acidic functional group may be selected from the group consisting of sulfonic acid, phosphonic acid, a sulfonimide unit and combinations thereof.

The sulfonated polyaromatic polyphosphazene may be a thermosetting polymer.

Preferably, the sulfonated polyaromatic polyphosphazene may have an ion-exchange capacity of not less than 1.2 mmol/g. More preferably, the sulfonated polyaromatic polyphosphazene may have an ion-exchange capacity of not less than 2.0 mmol/g. The sulfonated polyaromatic polyphosphazene may also be non-fluorinated.

DETAILED DESCRIPTION OF THE PREFERRED EMBODIMENTS

Figure 1:
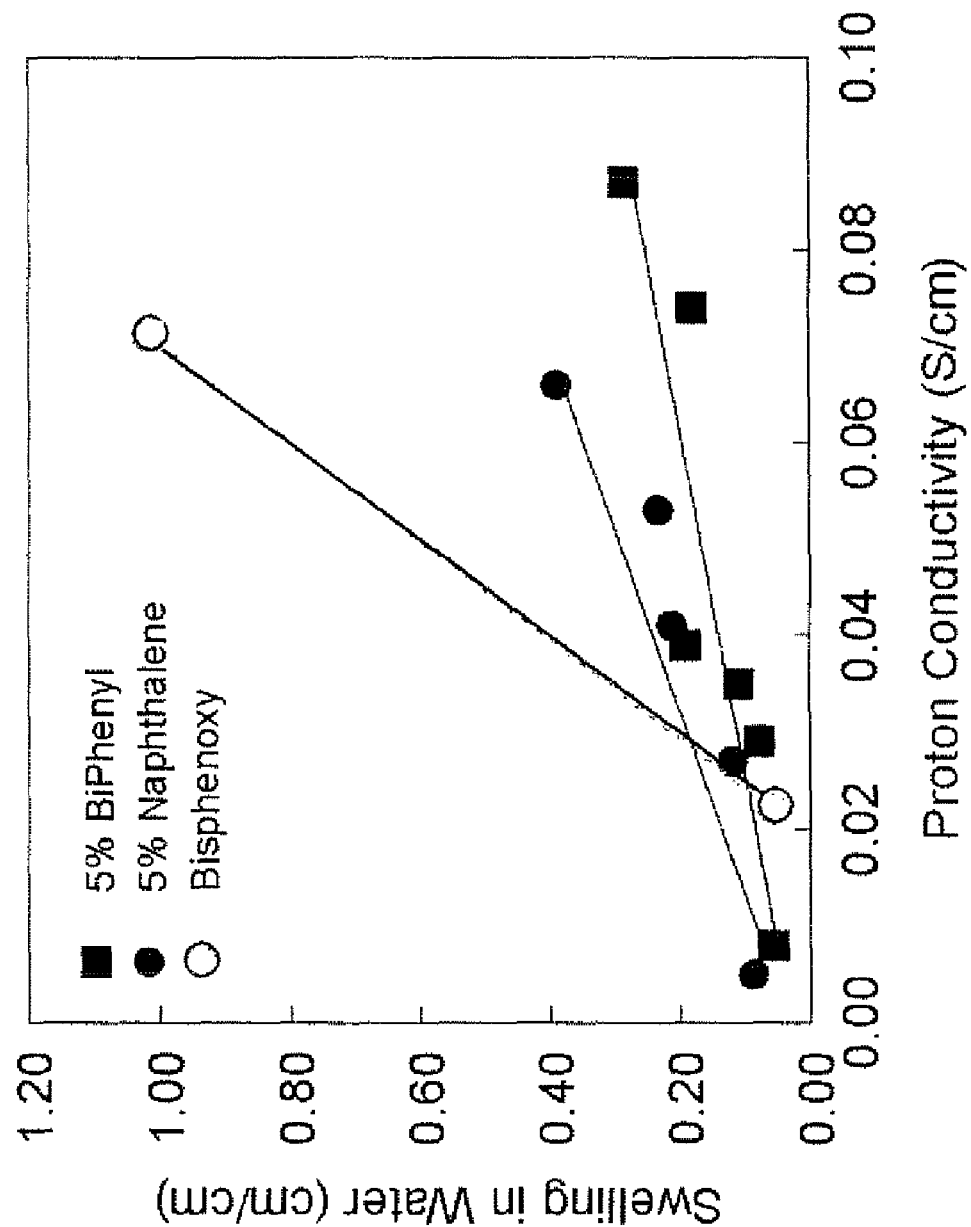
FIG. 1 is a plot showing water swelling versus proton conductivity of materials in accordance with the present invention.

Fuel cell performance increases with an increase in oxygen concentration at the cathode catalyst. A cathode binder with improved oxygen permeability can enhance fuel cell performance. Embodiments of the present invention include electrode binders having one or more of good dimensional stability, high proton conductivity, high electron conductivity, oxygen activation, thermal and oxidative stability and good oxygen permeability.

The oxygen permeability of the electrode binder can be increased using polymers having a high free volume and a low glass transition temperature. The glass transition temperature of the electrode binder is preferably lower than the operating temperature of a fuel cell in which it is used.

Polyphosphazenes have an inorganic polymer backbone, —[P=N]$_n$—, that is chemically stable, oxidative stable, and flexible. Substituted polyphosphazene polymers are readily prepared from poly(dichlorophosphazene) by substitution of the chlorine atoms on the backbone with the appropriate nueleophile, such as the sodium or lithium salt of phenol, aliphatic alcohol, or aromatic amine. Inorganic-organic hybrid polymers having an inorganic backbone and organic sidechains can be prepared through this approach. Hence, embodiments of the present invention include polyphosphazenes, but other polymers may also be used.

Electrode binders in accordance with the present invention may include a first polymer, preferably having a sidechain including an aromatic group, and at least one other component, the other component being for example a second polymer (such as an electron conducting polymer, a semiconducting polymer, or a polymer chosen to reduce the glass transition temperature of the electrode binder), an organometallic molecule, an acidic polymer, a free acid molecule, or some combination of these or other components.

Electrode binders in accordance with the present invention may also include sulfonated polyaromatic polyphosphazenes. The sulfonated polyaromatic polyphosphazenes may be non-fluorinated. The sulfonated polyaromatic polyphosphazenes may have one or more of the following properties: good dimensional stability, high proton conductivity, high electron conductivity, and oxygen activation. These materials may include chemically and thermally stable polymers with high free volume such as polyphosphazene-based materials, which are useful as improved electrolyte layers in fuel cell applications.

A sulfonated polyaromatic polyphosphazene according to another embodiment of the present invention is a polymer having the following structural formula:

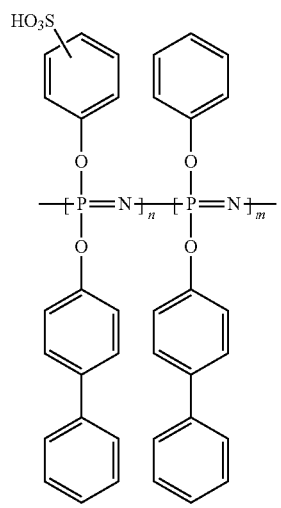

In this example, the polyphosphazene backbone has a sulfonated phenoxy side chain, a non-sulfonated phenoxy side chains and a polyaromatic side chain. The polyaromatic side chain in the present embodiment is 4-phenylphenoxy. The sulfonated phenoxy side chain is comprised of the sulfonic acid group liked to the phenoxy side group. The sulfonic acid group may be positioned at any one of 2-positions, 4-positions, 5-positions and 6-positions. In the alternative, the sulfonated polyaromatic phosphazene polymers of the present invention can be comprised of phosphonic acid functional groups linked to the non-polyaromatic side chains. In addition, sulfonimide functionalized polyphosphazenes are included in the present invention.

A different embodiment of the present invention is a polymer having the following structural formula:

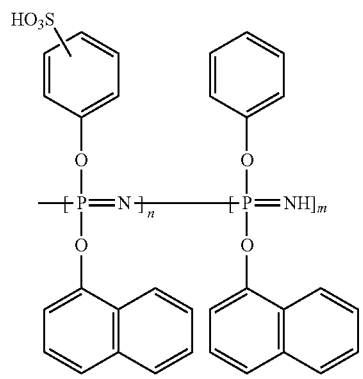

This example shows a similar phenoxy side group substituted with sulfonic acid as with the previous structural formula, however the polyaromatic side chain is comprised of naphthalene.

Yet another embodiment of the present invention is a polymer having the following structural formula wherein the polyphosphazene backbone has a polyaromatic side chain with three repeat units of 4-phenylphenoxy. Thus it is appreciated that the present invention includes a sulfonated polyphosphazene backbone with a polyaromatic side chain having a plurality of repeat units and is not limited by the examples shown in the diagrams.

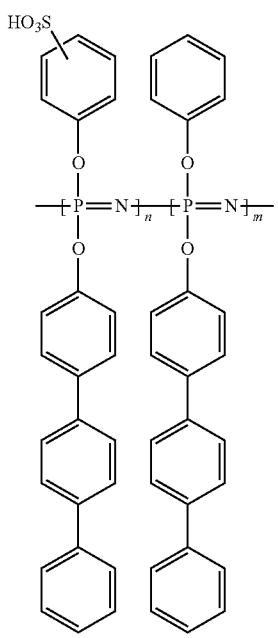

A sulfonated non-polyaromatic side chain can also include linked functional groups in addition to a sulfonic acid, phosphonic acid and sulfonimide side groups. For example, as shown in the following structural formula, the sulfonated non-polyaromatic side group can have an electron-withdrawing group attached to increase the acid dissociation constant of the sulfonic acid.

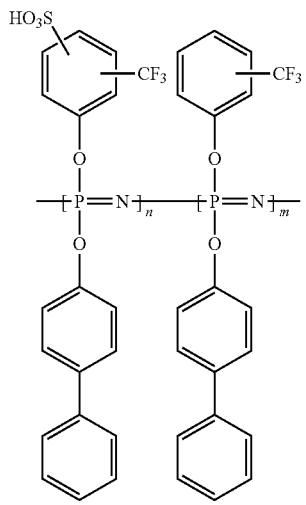

The polyaromatic functional groups of the previously shown structural formulas, and other embodiments that fall within the present invention, may be represented by functional groups R and OR, with R being an extended pi conjugated system, illustratively including biphenyl, naphthalene and their derivatives. An extended pi conjugated system is not necessary as the polyaromatic functional group may comprise an oligomer having two or more phenyl groups. In the alternative, R and OR can both be an extended pi conjugated system of an organic oligomer with at least two repeat units containing a six-membered aromatic sextet structure, illustratively including triphenyl and tetraphenyl.

The functional groups R and OR can also include a polycyclic aromatic group, with R including a fused six-membered aromatic sextet structure ring system having at least two rings or a six-membered aromatic sextet structure ring fused with a five-membered ring structure. The R functional group can also include at least two rings with a first ring being a six-membered aromatic sextet structure and a second ring containing a nonmetal such as nitrogen and/or oxygen.

In one instance, the sulfonated polyphosphazenes of the present invention include 5 to 60% (0.05 to 0.60 mole fraction) polyaromatic side chains with the remainder being non-polyaromatic side chains. More preferably 5 to 30% polyaromatic side chains are present in the sulfonated polyphosphazene, and even more preferred 5 to 20%.

The non-polyaromatic functional groups can be represented by functional groups OR, NRR' and/or R, wherein R and R' include alkyls, fluoroalkyls, phenyls, phenyoxys, and/or aromatic heterocycles.

Although not limiting the invention in any way, an example of a method producing a PEM material of the present invention and associated properties is described below.

An ink including an improved electrode binder according to the present invention can be used for preparation of improved electrodes. An example ink comprises one or more metal catalysts, a suspension medium, and an electrode binder according to an embodiment of the present invention. The electrode ink may be printed, bonded or coated onto the surface of a proton exchange membrane, or located proximate to a proton exchange membrane by any appropriate method.

The metal catalyst may include (but is not limited to) one or more of the following metal atoms: Pt, Sn, Fe, Co, Cr, Ni, Nb, V, Mo, Mn, Pd, Ru, Rh, Zr, Ir, Rh, or other transition metal. The metal catalyst may be supported on carbon, and is preferably 5-70% by weight.

The suspension medium may comprises for example, a hydrocarbon having ether, epoxy or ketone functionality and an alcohol which is not a solid at the processing temperature, preferably 40-95% weight medium, for example 1-methoxy-2 propanol.

Electrode binders may include polymer and/or non-polymer compounds having one or more acid groups (such as $-SO_3H$, $-PO_3H_2$, carboxylic acid groups), including halogenated acid-containing groups such as $-SO_2NHSO_2CF_3$, $-CF_2SO_2NHSO_2CF_3$, and heterocycles and the like, for example to enhance proton conductivity.

To provide increased proton conductivity of a binder at low relative humidity, polyphosphazene with a low equivalent weight (EW) may be used. The hydrophilicity of such a material can be balanced by hydrophobic co-substituent groups, and by crosslinking the polymer chains. However, crosslinking may decrease the free volume of the polymer and therefore decrease its oxygen permeability.

The anode electrodes and cathode electrodes in accordance with the present invention may be produced by any typical electrode fabrication method. A cathode electrode or an anode electrode utilizing a binder material in accordance with the present invention may be prepared by first grinding a catalyst, such as a PtCo/C catalyst. The catalyst may be ground for 30 sec×6 times using a grinder in a glove box. The catalyst, distilled water, ethanol, glycerol and a binder material, such as a sulfonated polyaromatic polyphosphazene, are mixed in a glove box to form a catalyst ink. The catalyst ink may then be stirred using an ultrasonic homogenizer, followed by stirring by a magnetic stirrer. The catalyst ink may then be cast on a Teflon sheet. The Teflon sheet, coated with the anode or cathode paste, is dried in an atmosphere of argon gas at atmospheric pressure at 80-100° C., and the solvent removed under reduced pressure. Thus hot pressing may be used to soften the membrane and embed a portion of the electrode into the membrane to ensure adherence.

Applications of gas-permeable materials according to the present invention include improved fuel cells, such as hydrogen fuel cells, direct methanol fuel cells, and other fuel cells, including fuel cells based on another cation species such as alkali metals. Other applications include other electrochemical devices, electrochromic devices, as separation and purification, gas-permeable membranes, other industrial gas processing, sensors, and other energy generating devices.

Fuel cells according to the present invention may include proton exchange membrane fuel cells. The proton exchange membrane may comprise a proton-conducting polyphosphazene, such a sulfonated polyphosphazene, a sulfonated polyaromatic polyphosphazene, or any other proton-conducting polymer. A polyphosphazene-based PEM can form a stable laminate with electrodes that also contain a polyphosphazene-based binder. However, the PEM may be any proton-conducting material, and is not limited to phosphazene polymers.

EXAMPLE 1

Starting materials of poly[(4-biphenyl phenoxy)(phenoxy) phosphazene] containing 5%, 10% and 30% biphenyl side chains were sulfonated and tested for ion-exchange capacity, equilibrium water swelling, proton conductivity and oxygen permeability. A sample containing 5% naphthalene side chains and a sample of bisphenoxy polyphosphazene was also produced and tested.

Prior to testing, all of the starting materials were sulfonated. To sulfonate the starting materials, the polymers were dissolved in dichloroethane (DCE) by stirring said polymers in the DCE for 12 hours at 25° C. Thereafter, the solution was purged with nitrogen and cooled to 0° C. with ice. While stirring, the $SO_3$/DCE solution was added to the polyphosphazene causing the sulfonated product to precipitate out of solution thereby forming a suspension. After 2 hours of stirring, the solution was neutralized with a NaOH/methanol solution and the DCE and methanol solvents were evaporated at 60° C. The remaining product was washed several times with distilled water and 0.1 M NaOH, followed by distilled water.

A membrane was prepared by dissolving the dry sulfonated phosphazene polymer into dimethylacetamide (DMAc) at 150° C. After cooling to room temperature, the solution was cast into a polytetrafluoroethylene (PTFE) dish. The solvent was evaporated at 80° C. and the dry film was treated in 1 molar sulfuric acid and washed repeatedly with distilled water. The ion-exchange capacity, equilibrium water swelling, proton conductivity and oxygen permeability at room temperature and 50% relative humidity were determined along with differential scanning calorimetry performed on selected samples.

The proton conductivity of the samples was measured by an AC impedance method. Membrane samples were soaked in distilled water for 24 hours before measuring conductivity. As shown in FIG. 1, the 5% biphenyl and 5% naphthalene samples exhibit a significantly lower water swelling for a given proton conductivity when compared to current state-of-the-art sulfonated bisphenoxy polyphosphazene. Water swelling was determined from the linear swelling of a circular membrane sample using the expression:

$$\text{Swelling(cm/cm)} = \frac{\text{final diameter} - \text{initial diameter}}{\text{initial diameter}}$$

The samples of the sulfonated polyaromatic phosphazenes of the present invention demonstrated an ion exchange capacity of greater than 1.0 mmol/g and swelling of less than 20% and an ion exchange capacity of greater than 1.4 mmol/g and swelling less than 25%.

Figure 2:
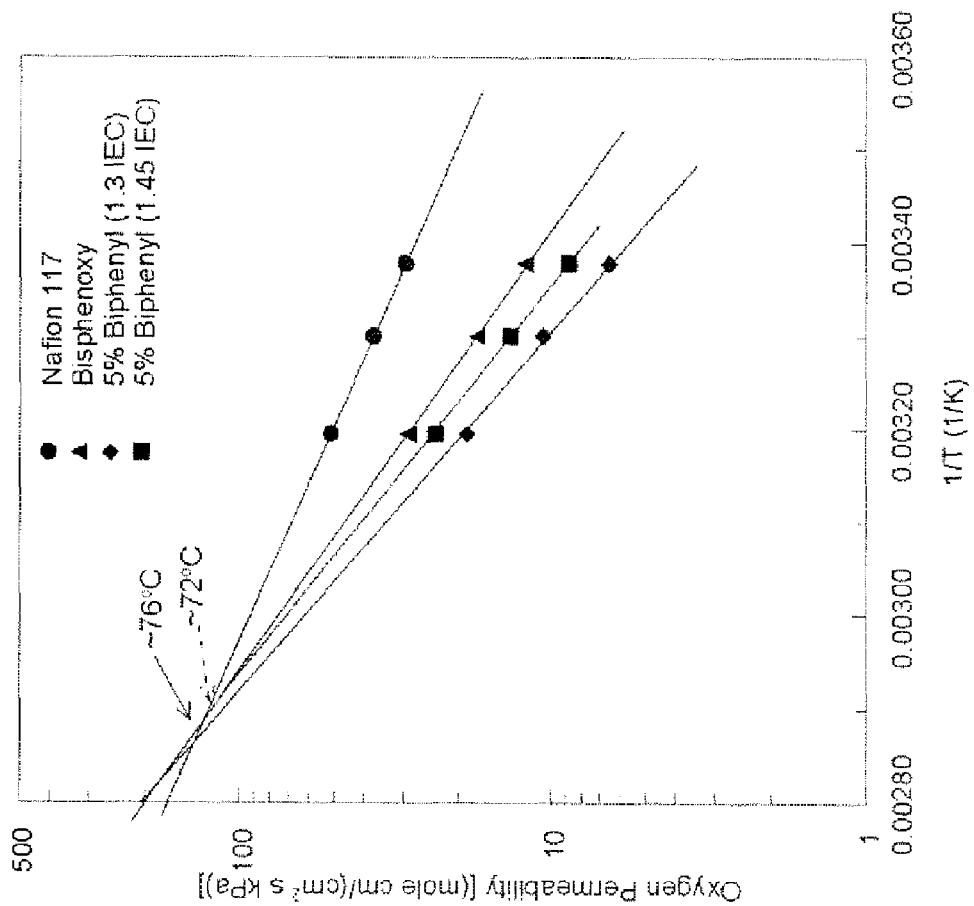
FIG. 2, is a plot showing the oxygen permeability of materials in accordance with the present invention.

Oxygen permeability of the samples was also measured. The results are shown in FIG. 2. The results show that at temperatures above 76° C., the $O_2$ permeability in 5% 1.3 IEC phenylphenoxy substituted phosphazene is greater than that for Nafion®. At room temperature, the oxygen permeability of 5% Biphenyl (1.45 IEC) is slightly higher than that of the 1.3 IEC material.

Prior analyses of the swelling and conductivity of sulfonated polyphosphazene polymers led to the selection of a polymer containing 5% phenylphenoxy side groups (the remaining side groups being phenoxy moieties) as a suitable electrode binder material (with an IEC=1.30 mmol/g). For comparison purposes, sulfonated bisphenoxy phosphazene (0% phenylphenoxy content) was also examined as a binder (with an IEC=1.40 mmol/g). Five Pt-compatible solvents were tested: water, methanol, ethanol, propanol, and glycerol. It occurred that water was a nonsolvent, while ethanol and propanol only partially dissolved the two phosphazene polymers. Glycerol formed a very viscous solution (suspension). Only methanol provided a solution with no sediment after 24 hours. Based on these studies, 1% polymer solutions in methanol were prepared for further investigations. For comparative studies inks were also prepared using ethanol and 1% polymer.

Anode and cathode catalyst inks were prepared using 40 wt % Pt/C (Alfa Aesar). The required amount of catalyst (0.4 mg/cm$^2$ of Pt) was moistened with deionized water followed by addition of a 1 wt % sulfonated polyphosphazene in methanol solution. A sufficient amount of polymer/solvent was added to produce an ink with either 7.5 or 15.0 wt % polymer binder (wt % based on Pt loading). Reference membrane electrode assemblies with Nafion® binder were made from 40 wt % Pt/C with deionized water, isopropyl alcohol, and a 5 wt % Nafion® solution (Aldrich), where the amount of Nafion® binder was 30 wt % with respect to Pt. The ink mixtures were sonicated for one hour and then stirred overnight. The inks were then painted onto single sided ELAT (E-TEK) carbon cloth current collectors. The painted sheets were dried at 60° C. for 30 minutes to fully evaporate the solvent. Membrane electrode assemblies were prepared by hot pressing one polyphosphazene-binder electrode and one Nafion® control electrode onto a Nafion® 212 membrane at 140° C. and 400 psi for 5 minutes. Membrane electrode assemblies were immersed in a 1.0 M $H_2SO_4$ solution overnight and then rinsed thoroughly with deionized water.

After a membrane electrode assembly was loaded into the 5 cm$^2$ fuel cell test fixture, fully humidified hydrogen and air were fed to the cell at ambient pressure and constant flow rates (100 and 500 ml/min for hydrogen and air, respectively). A load-cycling procedure was utilized during a break-in period by alternating between high voltage (0.6-0.7V) and low voltage (0.2V) every 5 minutes. After a minimum break-in time of 6 hours at the specified test temperature (or when there was no further increase in the cell performance, i.e., the measured current density for a given voltage), a current density-voltage curve was recorded.

Figure 3:
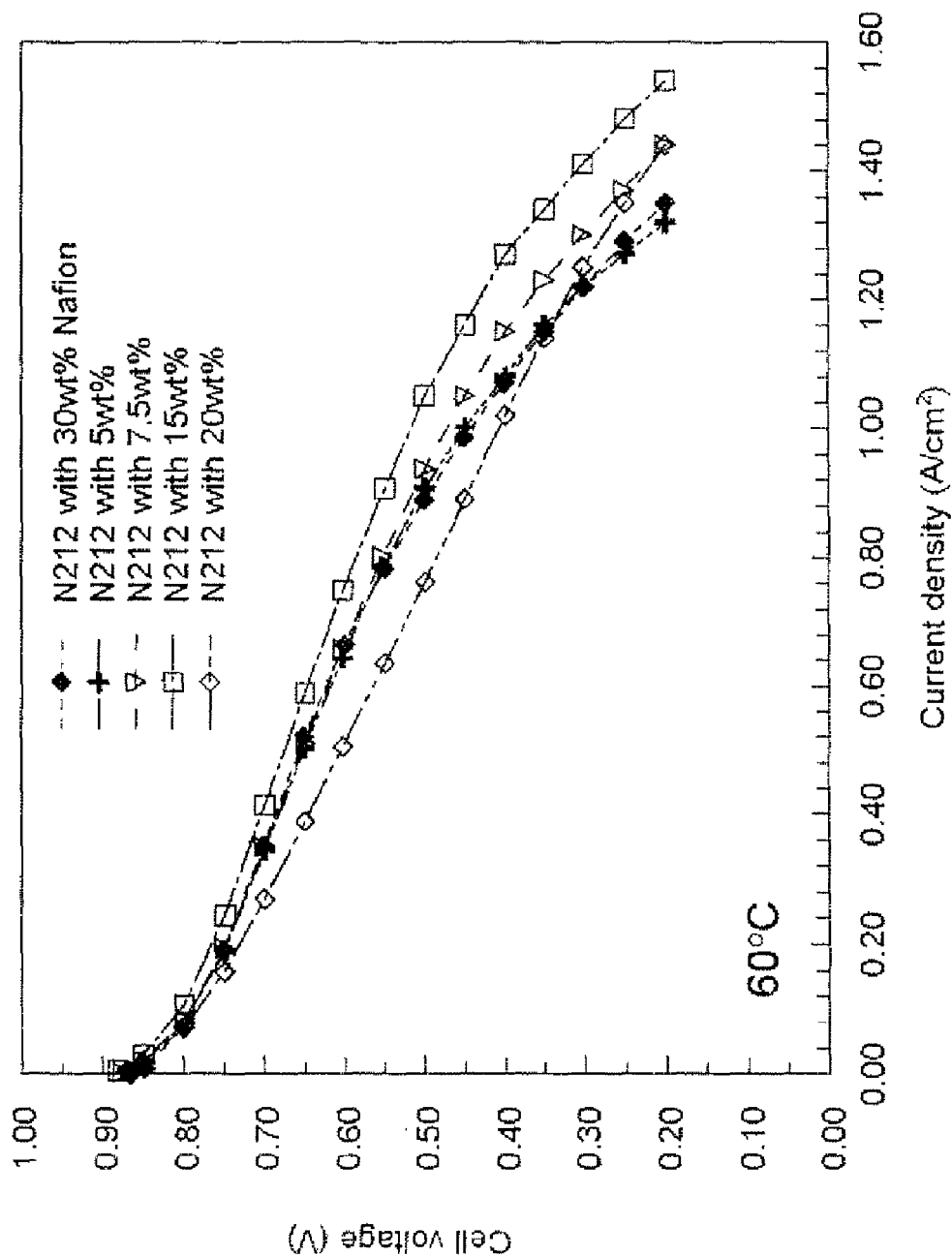
FIG. 3, is a plot showing the effect of anode binder loading on performance of a fuel cell at 60° C.
Figure 4:
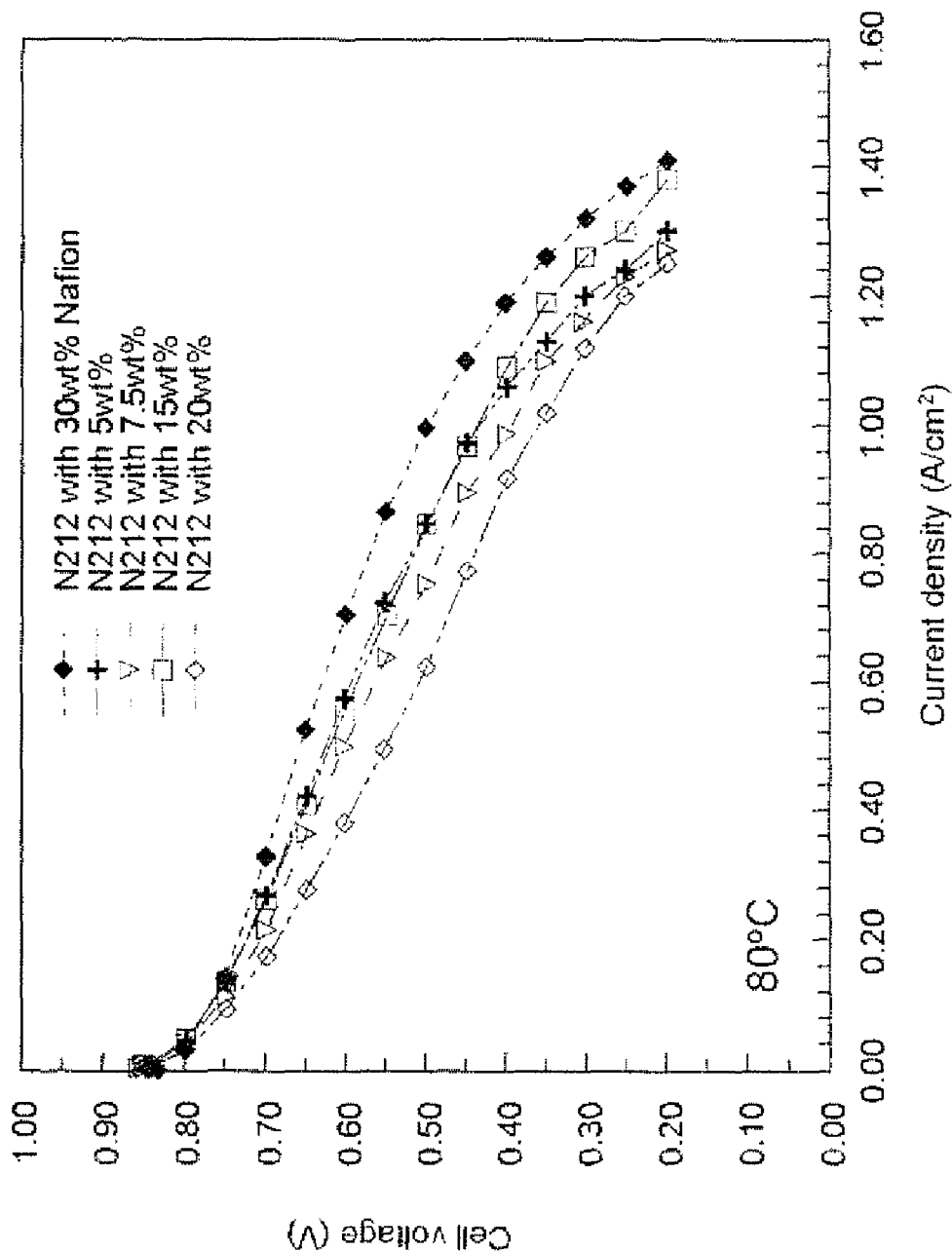
FIG. 4, is a plot showing the effect of anode binder loading on performance of a fuel cell at 80° C.

FIGS. 3 and 4 show the effect of sulfonated polyphosphazene anode binder (1.45 IEC) loading on performance of a fuel cell with Nafion® 212 membrane at 60° C. and 80° C. At 60° C., the performance of the fuel cells did not differ significantly with the fuel cell having the anode with 15 wt % sulfonated polyphosphazene exhibiting the best performance. At 80° C., the fuel cell performance with anodes having sulfonated polyphosphazene binder loading in the range of 5-15 wt % showed similar performance.

Figure 5:
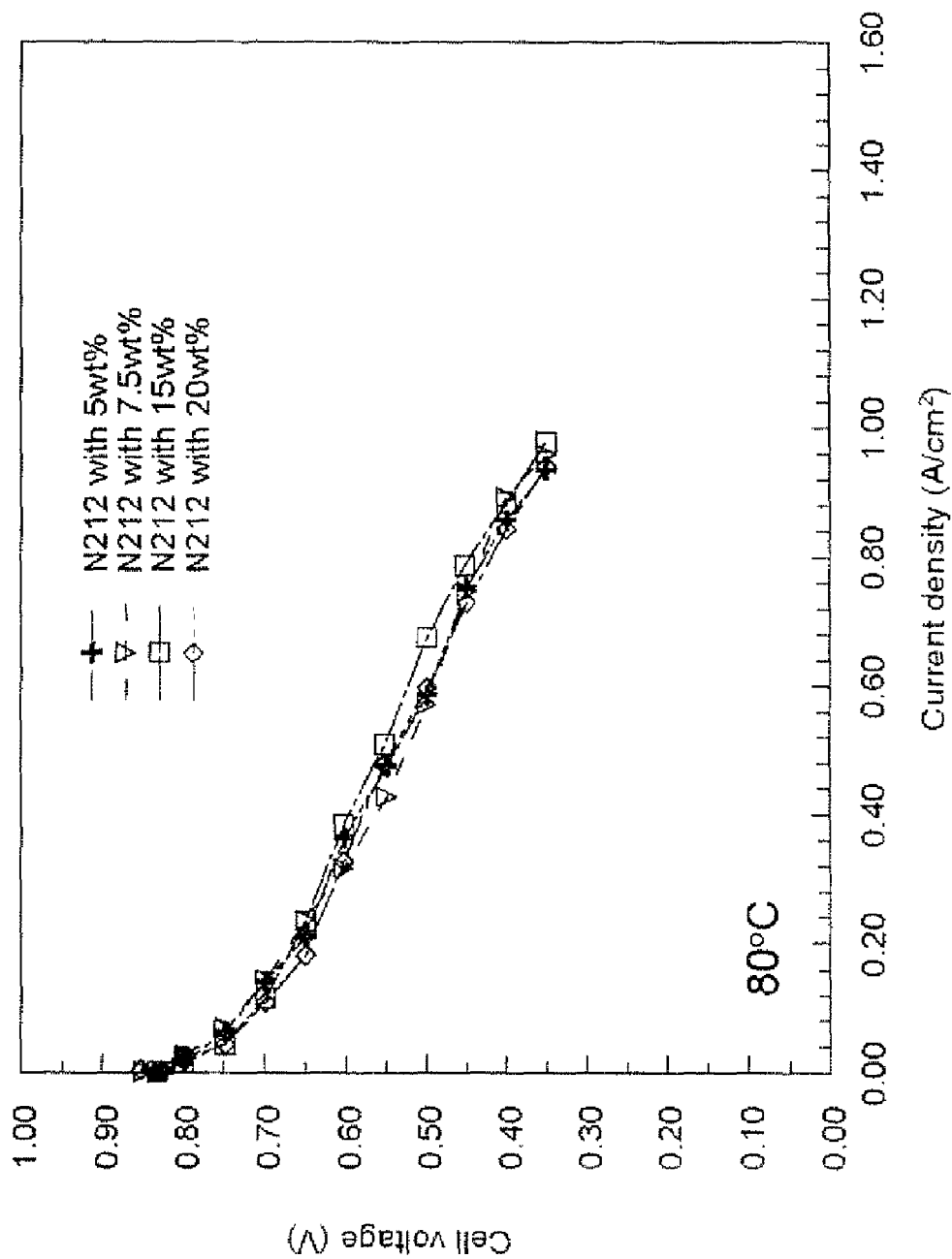
FIG. 5, is a plot showing the effect of cathode binder loading on fuel cell performance at 80° C.

FIG. 5 shows the effect of cathode binder loading on fuel cell performance at 80° C. There as little change in fuel cell performance when the cathode binder loading of sulfonated polyphosphazene (1.45 IEC) was increased from 5 wt % to 20 wt %. The best performance was obtained with 15 wt % sulfonated polyphosphazene (1.45 IEC) at 80° C.

Figure 7:
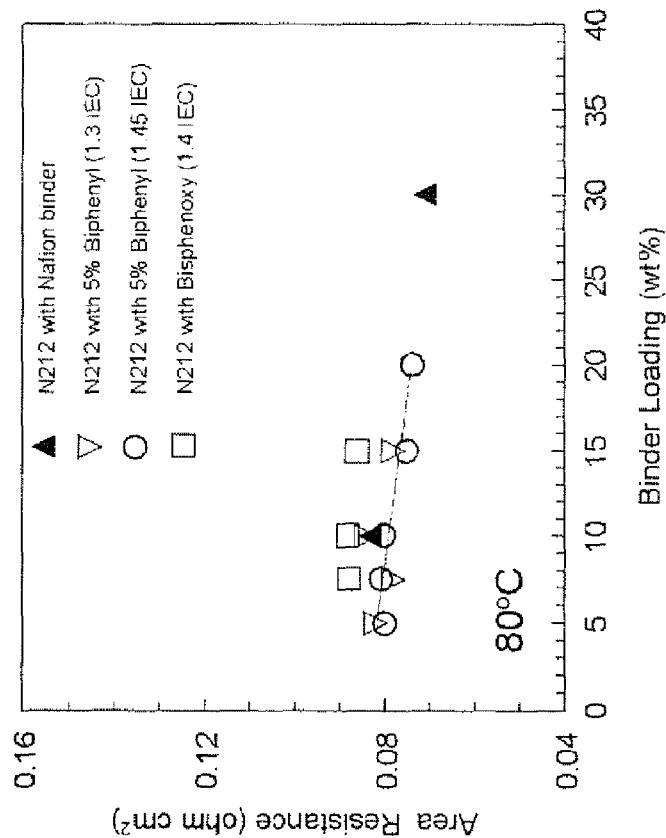
FIG. 7 is a plot showing the sheet resistances at 0.6V for membrane electrode assemblies utilizing materials in accordance with the present invention at 80° C.
Figure 6:
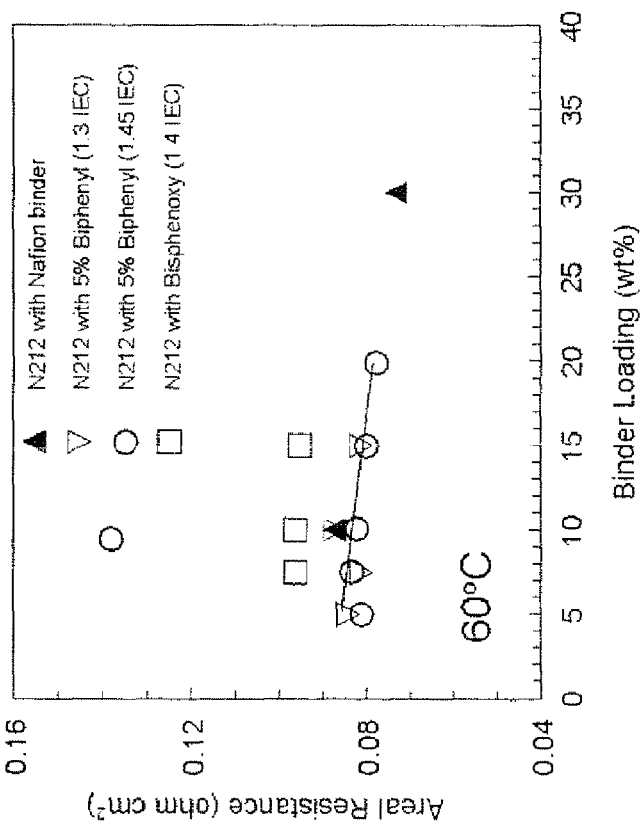
FIG. 6 is a plot showing the sheet resistances at 0.6V for membrane electrode assemblies utilizing materials in accordance with the present invention at 60° C.

FIGS. 6 and 7 show the sheet resistances at 0.6V for membrane electrode assemblies utilizing Nafion® binder and sulfonated polyphosphazene binders at 60° C. and 80° C. The results show that the area-specific resistances of membrane electrode assemblies made from 5% biphenyl sulfonated polyphosphazene binder are lower than with bisphenoxy sulfonated polyphosphazene. The use of a higher IEC sulfonated polyphosphazene (1.45 vs. 1.3 mmol/g) did not result in a lower resistance. There was also little change in area-specific resistance with binder loading (for 1.45 IEC sulfonated polyphosphazene). Compared to a membrane electrode assembly made with 30 wt % Nafion® binder, membrane electrode assemblies with 5% biphenyl sulfonated polyphosphazene had a slightly higher area-specific resistance.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

The invention claimed is:

1. A fuel cell electrode comprising:
a catalyst layer including a sulfonated polyaromatic polyphosphazene, said sulfonated polyaromatic polyphosphazene comprising:
a polyphosphazene backbone; and
a polyaromatic functional group linked to said polyphosphazene as a polyaromatic side chain.

2. The fuel cell electrode according to claim 1, wherein said polyaromatic functional group is selected from the group consisting of R and OR, said R and said OR comprising an extended pi conjugated system.

3. The fuel cell electrode according to claim 2, wherein said R and said OR are comprised of an extended pi conjugated system of an organic oligomer with at least two repeat units containing a six-membered aromatic sextet structure.

4. The fuel cell electrode according to claim 1, wherein said polyaromatic functional group is selected from the group consisting of R and OR, said R and said OR comprising a polycyclic aromatic group.

5. The fuel cell electrode according to claim 4, wherein R is a fused six-membered aromatic sextet structure ring system having at least two rings.

6. The fuel cell electrode according to claim 4, wherein R is a six-membered aromatic sextet structure ring fused with a five-membered ring structure.

7. The fuel cell electrode according to claim 4, wherein R has at least two rings, a first ring being a six-membered aromatic sextet structure and a second ring containing a non-metal selected from the group consisting of nitrogen and oxygen.

8. The fuel cell electrode according to claim 1, wherein the mole fraction of said polyaromatic functional group linked to said polyphosphazene as a polyaromatic side chain is between 0.05 and 0.60.

9. The fuel cell electrode according to claim 1, wherein said sulfonated polyaromatic polyphosphazene further comprises a non-polyaromatic functional group linked to said polyphosphazene backbone as a non-polyaromatic side chain and an acidic functional group linked to said non-polyaromatic side chain.

10. The fuel cell electrode according to claim 9, wherein said non-polyaromatic functional group is selected from the group consisting of OR, NRR', R and combinations thereof, said R and R' selected from the group consisting of an alkyl, a fluoroalkyl, a phenyl, an oxyphenyl and an aromatic heterocycle.

11. The fuel cell electrode according to claim 9, wherein said acidic functional group is selected from the group consisting of sulfonic acid, phosphonic acid, a sulfonimide unit and combinations thereof.

12. The fuel cell electrode according to claim 1, wherein said sulfonated polyaromatic polyphosphazene is a thermosetting polymer.

13. The fuel cell electrode according to claim 1, wherein said sulfonated polyaromatic polyphosphazene has an ion-exchange capacity of not less than 1.2 mmol/g.

14. The fuel cell electrode according to claim 1, wherein said sulfonated polyaromatic polyphosphazene has an ion-exchange capacity of not less than 2.0 mmol/g.

15. The fuel cell electrode according to claim 1, wherein said sulfonated polyaromatic polyphosphazene is non-fluorinated.

16. The fuel cell electrode according to claim 1, wherein said fuel cell electrode is an anode.

17. The fuel cell electrode according to claim 1, wherein said fuel cell electrode is a cathode.

18. A fuel cell electrode comprising:
a catalyst layer including a sulfonated polyaromatic polyphosphazene, said sulfonated polyaromatic polyphosphazene comprising:
a polyphosphazene backbone; and
a polyaromatic functional group linked to said polyphosphazene as a polyaromatic side chain wherein said polyaromatic functional group is selected from the group consisting of R and OR, said R and said OR comprising a polycyclic aromatic group.

* * * * *

UNITED STATES PATENT AND TRADEMARK OFFICE
CERTIFICATE OF CORRECTION

| | |
|---|---|
| PATENT NO. | : 7,943,675 B2 |
| APPLICATION NO. | : 12/049542 |
| DATED | : May 17, 2011 |
| INVENTOR(S) | : John Muldoon et al. |

It is certified that error appears in the above-identified patent and that said Letters Patent is hereby corrected as shown below:

Title Page (item 54) & Col. 1

Title: Replace "ELECTROLYTES FOR FUEL CELL ELECTRODES" with --NOVEL ELECTROLYTES TO ENHANCE OXYGEN REDUCTION REACTION (ORR) IN THE CATHODE LAYER OF PEM FUEL CELL--

(Item 56)

IDS: Replace "Allcock, H.R. et al.; "Phosphonation of Aryloxyphosphazenes"; Macromolecules; (2001) Hoffman, M.A. et al.; "Synthesis of Polyphosphazenes with Sulfonimide Side Groups"; Macromolecules (2002). with --Allcock, H.R. et al.; "Phosphonation of Aryloxyphosphazares"; Maeromolecules; (2001).-- Hoffman, M.A. et al.;

Column 2, Line 38, Replace "Five" with --five--

Signed and Sealed this
Third Day of January, 2012

David J. Kappos
*Director of the United States Patent and Trademark Office*

UNITED STATES PATENT AND TRADEMARK OFFICE
CERTIFICATE OF CORRECTION

PATENT NO. : 7,943,675 B2  Page 1 of 1
APPLICATION NO. : 12/049542
DATED : May 17, 2011
INVENTOR(S) : John Muldoon et al.

It is certified that error appears in the above-identified patent and that said Letters Patent is hereby corrected as shown below:

Title Page (item 54) & Col. 1, lines 1 and 2,

Title: Replace "ELECTROLYTES FOR FUEL CELL ELECTRODES" with --ELECTROLYTES TO ENHANCE OXYGEN REDUCTION REACTION (ORR) IN THE CATHODE LAYER OF PEM FUEL CELL--

(Item 56)

IDS: Replace "Allcock, H.R. et al.; "Phosphonation of Aryloxyphosphazenes"; Macromolecules; (2001) Hoffman, M.A. et al.; "Synthesis of Polyphosphazenes with Sulfonimide Side Groups"; Macromolecules (2002). with --Allcock, H.R. et al.; "Phosphonation of Aryloxyphosphazares"; Maeromolecules; (2001).-- Hoffman, M.A. et al.;

Column 2, Line 38, Replace "Five" with --five--

This certificate supersedes the Certificate of Correction issued January 3, 2012.

Signed and Sealed this
Thirty-first Day of January, 2012

David J. Kappos
*Director of the United States Patent and Trademark Office*